United States Patent
Hwang

(10) Patent No.: US 11,608,009 B2
(45) Date of Patent: Mar. 21, 2023

(54) CAMERA SIGNAL MONITORING APPARATUS AND METHOD

(71) Applicant: HYUNDAI MOBIS CO., LTD., Seoul (KR)

(72) Inventor: Tae Hun Hwang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/387,317

(22) Filed: Jul. 28, 2021

(65) Prior Publication Data

US 2021/0354637 A1 Nov. 18, 2021

Related U.S. Application Data

(63) Continuation of application No. 16/847,014, filed on Apr. 13, 2020, now Pat. No. 11,299,107.

(30) Foreign Application Priority Data

Apr. 18, 2019 (KR) .................. 10-2019-0045341

(51) Int. Cl.
*B60R 11/04* (2006.01)
*H04N 5/232* (2006.01)
*H04N 5/222* (2006.01)

(52) U.S. Cl.
CPC ........... *B60R 11/04* (2013.01); *H04N 5/2228* (2013.01); *H04N 5/23206* (2013.01)

(58) Field of Classification Search
None
See application file for complete search history.

(56) References Cited

U.S. PATENT DOCUMENTS 11,299,107 B2 * 4/2022 Hwang ............... H04N 5/2228
2011/0246071 A1 * 10/2011 Tsunekawa ............ G08G 1/166
701/301

(Continued)

FOREIGN PATENT DOCUMENTS

CN 106114513 A 11/2016
JP 2007-192583 A 8/2007

(Continued)

OTHER PUBLICATIONS

Office Action issued in corresponding U.S. Appl. No. 16/847,014 dated Aug. 25, 2021.

(Continued)

*Primary Examiner* — Kaitlin A Retallick
(74) *Attorney, Agent, or Firm* — Morgan, Lewis & Bockius LLP

(57) ABSTRACT

The present disclosure provides a camera signal monitoring apparatus and method, the camera signal monitoring apparatus including a processor, which includes a vehicle information input unit for receiving a vehicle speed and a yaw rate signal of a vehicle; a camera information input unit for receiving a camera signal including a vehicle speed and a yaw rate signal from a vehicle front camera; and a monitoring unit for calculating a vehicle driving trajectory using the vehicle speed and the yaw rate signal of the vehicle input from the vehicle information input unit, calculating a reference curvature value based on the calculated vehicle driving trajectory, and determining a reliability by comparing the calculated reference curvature value with a curvature value calculated by the camera signal input from the camera information input unit.

10 Claims, 2 Drawing Sheets

(56) References Cited

U.S. PATENT DOCUMENTS

2016/0327948 A1* 11/2016 Taguchi ............... G05D 1/0278
2017/0332010 A1* 11/2017 Asakura ............. H04N 5/23222

FOREIGN PATENT DOCUMENTS

| JP | 2011-073529 A | 4/2011 |
| KR | 2013-0025055 A | 3/2013 |
| KR | 10-2014-0091309 A | 7/2014 |
| KR | 10-2018-0006759 A | 1/2018 |
| KR | 10-2018-0116749 A | 10/2018 |

OTHER PUBLICATIONS

Office Action issued in corresponding Chinese Patent Application No. 202010307893.X dated Sep. 29, 2021.
Office Action issued in corresponding Korean Patent Application No. 10-2020-0069945 dated May 31, 2021, with English translation.
Office Action issued in corresponding Korean Patent Application No. 10-2013-0025055 dated Jan. 29, 2023, with English translation.

* cited by examiner

CAMERA SIGNAL MONITORING APPARATUS AND METHOD

CROSS REFERENCE TO RELATED APPLICATION

The present application is the continuation application of U.S. patent application Ser. No. 16/847,014, filed on Apr. 13, 2020, which claims priority to Korean Patent Application No. 10-2019-0045341, filed Apr. 18, 2019, the entire contents of which is incorporated herein for all purposes by this reference.

BACKGROUND

Technical Field

The present disclosure relates to a camera signal monitoring apparatus and method and, more particularly, to a camera signal monitoring apparatus and method that determines whether a signal output from a vehicle front camera is abnormal.

Description of the Related Art

Recently, for the convenience of a driver who uses a vehicle, various sensors and electronic devices are provided in the vehicle. In particular, research on an advanced driver assistance system (ADAS) has been actively conducted for driver convenience. Furthermore, an autonomous vehicle has been actively developed.

In addition, many automakers are presenting semi-autonomous driving functions on the basis of their own algorithms and systems. Typical examples of the systems include a smart cruise control that maintains a vehicle speed relative to vehicles in front and performs functions in conjunction with navigation, a lane keeping assist (LKA) that actively keeps a vehicle in lane, a forward collision-avoidance assist, an emergency braking system, and the like.

Such systems perform vehicle control using the information input through a vehicle front camera, and the vehicle front camera receives a yaw rate signal and vehicle speed information of the vehicle and provides lane information, lane offset, curvature information, and the like for the purpose of vehicle control.

The reliability of information output from the front camera is important. In the related art, the vehicle controller cannot interpret signal processing inside the camera, so that it is not clear whether the front camera signal is normal or abnormal, or at what period and when to check the signal. When the yaw rate signal used inside the front camera is incorrectly input or erroneously corrected, errors are caused in the output value, which results in a malfunction when controlling the vehicle using the front camera.

SUMMARY

The present disclosure has been made keeping in mind the above problems occurring in the related art, and the present disclosure has an objective to provide a camera signal monitoring apparatus and method that determines whether signal output from a vehicle front camera is abnormal according to the reliability of a calculation algorithm inside the camera.

A camera signal monitoring apparatus according to an aspect of the present disclosure includes a processor. The processor includes a vehicle information input unit for receiving a vehicle speed and a yaw rate signal of a vehicle; a camera information input unit for receiving a camera signal including a vehicle speed and a yaw rate signal from a vehicle front camera; and a monitoring unit for calculating a vehicle driving trajectory using the vehicle speed and the yaw rate signal of the vehicle input from the vehicle information input unit, calculating a reference curvature value based on the calculated vehicle driving trajectory, and determining a reliability by comparing the calculated reference curvature value with a curvature value calculated by the camera signal input from the camera information input unit.

According to an embodiment of the present disclosure, the monitoring unit may include a vehicle trajectory calculator that calculates the vehicle driving trajectory on the basis of an offset-corrected yaw rate signal and the vehicle speed input from the vehicle information input unit. The vehicle trajectory calculator calculates a first curvature value by dividing a yaw rate value of the offset-corrected yaw rate signal by a vehicle speed value of the vehicle speed signal.

According to an embodiment of the present disclosure, the apparatus may further include a navigation information input unit for receiving a road curvature signal provided from a high precision map, wherein the monitoring unit further includes a reference curvature calculator that calculates the reference curvature value by combining the first curvature value calculated by the vehicle trajectory calculator and a second curvature value of the road curvature signal input from the navigation information input unit.

According to an embodiment of the present disclosure, the apparatus may further include a LiDAR & radar sensor input unit for receiving a sensing value from a LiDAR or a radar to calculate a third curvature value, wherein the reference curvature calculator calculates the reference curvature value by combining the first curvature value calculated by the vehicle trajectory calculator, the second curvature value of the road curvature signal input from the navigation information input unit, and the third curvature value input from the LiDAR & radar sensor input unit.

According to an embodiment of the present disclosure, the monitoring unit may include a reliability determiner that calculates a reliability value of the front camera when the camera signal curvature value calculated using the camera signal is equal to or greater than a threshold value compared to the reference curvature value.

According to an embodiment of the present disclosure, the reliability determiner may determine a percentage value of a difference between the camera signal curvature value and the reference curvature value as the reliability value of the front camera when the camera signal curvature value is equal to or greater than the threshold value compared to the reference curvature value.

According to an embodiment of the present disclosure, the monitoring unit may determine that the camera signal of the front camera is abnormal and output a front camera abnormal signal when the reliability value is greater than or equal to a threshold value during a predetermined time. The monitoring unit outputs the front camera abnormal signal to at least one of a warning unit that notifies a driver of the abnormality and a vehicle control unit that performs control in such a manner as to transition an operation of a vehicle control system using the front camera to a standby state.

A camera signal monitoring method according to the present disclosure includes receiving, by a monitoring unit, a vehicle speed and a yaw rate signal of a vehicle from a vehicle information input unit; receiving, by the monitoring unit, a camera signal including a vehicle speed and a yaw rate signal of a vehicle front camera from a camera information input unit; calculating, by the monitoring unit, a vehicle driving trajectory using the vehicle speed and the yaw rate signal of the vehicle, which are received from the vehicle information input unit; calculating, by the monitoring unit, a reference curvature value on the basis of the calculated vehicle driving trajectory; and determining, by the monitoring unit, a reliability by comparing the calculated reference curvature value with a curvature value calculated using the camera signal input from the camera information input unit.

According to an embodiment of the present disclosure, the calculating of the vehicle driving trajectory may include calculating the vehicle driving trajectory based on an offset-corrected yaw rate signal and the vehicle speed from the vehicle information input unit, wherein a first curvature value is calculated by dividing a yaw rate value of the offset-corrected yaw rate signal by a vehicle speed value of the vehicle speed signal.

According to an embodiment of the present disclosure, the method may further include receiving, by the monitoring unit, a road curvature signal provided by a high precision map from a navigation information input unit, wherein the calculating of the reference curvature value includes calculating the reference curvature value by combining the first curvature value obtained in the calculating of the vehicle driving trajectory and a second curvature value of the road curvature signal input from the navigation information input unit.

According to an embodiment of the present disclosure, the method may further include receiving, by a LiDAR & radar sensor input unit, a sensing value from a LiDAR or a radar to calculate a third curvature value, wherein the calculating of the reference curvature value includes calculating the reference curvature value by combining the first curvature value calculated in the calculating of the vehicle driving trajectory, the second curvature value of the road curvature signal input from the navigation information input unit, and the third curvature value input from the LiDAR & radar sensor input unit.

According to an embodiment of the present disclosure, the determining of the reliability may include calculating a reliability value of the front camera, when the camera signal curvature value calculated by the camera signal is equal to or greater than a threshold value compared to the reference curvature value.

According to an embodiment of the present disclosure, the determining of the reliability may include determining a percentage value of a difference between the camera signal curvature value and the reference curvature value as the reliability value of the front camera, when the camera signal curvature value is equal to or greater than the threshold value compared to the reference curvature value.

According to an embodiment of the present disclosure, the method may further include determining, by the monitoring unit, that the camera signal of the front camera is abnormal and outputting a front camera abnormal signal, when the reliability value is greater than or equal to a threshold value during a predetermined time, wherein the outputting of the abnormal signal includes outputting the front camera abnormal signal to at least one of a warning unit that notifies a driver of the abnormality or a vehicle control unit that performs control in such a manner as to transition an operation of a vehicle control system using the front camera to a standby state.

The camera signal monitoring apparatus and method according to an embodiment of the present disclosure has an advantage that the reliability is determined with respect with whether a signal output from a vehicle front camera is abnormal, to notify the driver of the abnormality or perform control in such a manner as to transition the state of the control system to the standby state, thereby preventing a malfunction when controlling the vehicle using the camera.

In addition, the camera signal monitoring apparatus and method according to an embodiment of the present disclosure has an advantage that it is possible to primarily determine whether there is a problem with the camera signal by determining whether an calculation algorithm inside the camera is abnormal, rather than verifying the camera output signal, and when the camera signal is corrected, it is possible to prevent the camera from malfunctioning by comparing the camera signal with the vehicle signal.

BRIEF DESCRIPTION OF THE DRAWINGS

The above and other objects, features, and other advantages of the present disclosure will be more clearly understood from the following detailed description when taken in conjunction with the accompanying drawings, in which.

DETAILED DESCRIPTION

Figure 1:
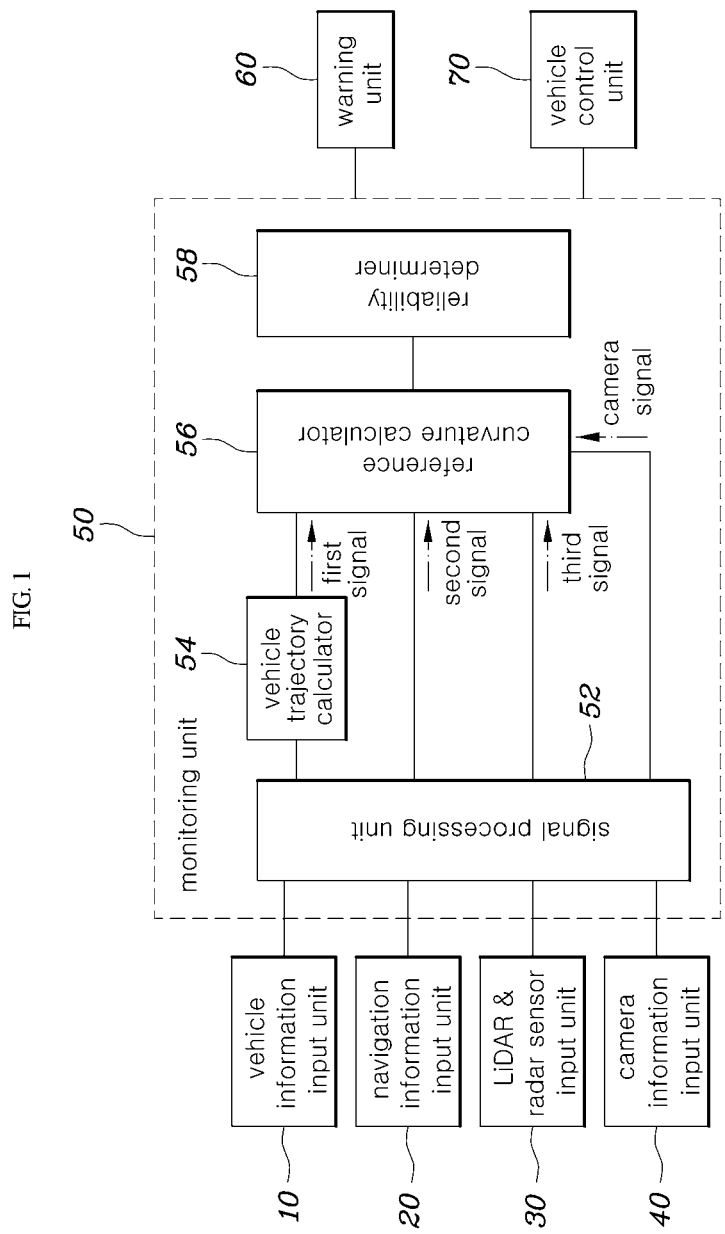
FIG. 1 is a block diagram showing a camera signal monitoring apparatus according to an embodiment of the present disclosure.

Hereinafter, a camera signal monitoring apparatus and method according to an embodiment of the present disclosure will be described with reference to the accompanying drawings. In this process, the thickness of lines or the size of components shown in the drawings may be exaggerated for clarity and convenience.

In addition, terms to be described later are terms defined in consideration of functions in the present disclosure, which may vary according to a user's or operator's intention or practice. Therefore, the definition of these terms should be made on the basis of the contents throughout the specification.

Also, the implementations described herein can be implemented, for example, as a method or process, apparatus, software program, data stream, or signal. Although discussed only in the context of a single form of implementation (e.g., discussed only as a method), implementation of the discussed features may also be implemented in other forms (e.g., devices or programs). The device can be implemented with suitable hardware, software and firmware, and the like. The method can be implemented in an apparatus, such as a processor, generally referring to a processing device, including, for example, a computer, microprocessor, integrated circuit, or programmable logic device. The processor also includes communication devices such as computers, cell phones, portable/personal digital assistants ("PDAs"), and other devices, which facilitate communication of information between end-users.

FIG. 1 is a block diagram showing a camera signal monitoring apparatus according to an embodiment of the present disclosure. Referring to FIG. 1, a camera signal monitoring apparatus will be described as follows.

As shown in FIG. 1, the camera signal monitoring apparatus according to an embodiment of the present disclosure includes an associated non-transitory memory storing software instructions which, when executed by, e.g., a processor, provides the functionalities of a vehicle information input unit 10, a navigation information input unit 20, a LiDAR & radar sensor input unit 30, a camera information input unit 40, and a monitoring unit 50. Herein, the memory and the processor may be implemented as separate semiconductor circuits. Alternatively, the memory and the processor may be implemented as a single integrated semiconductor circuit. The processor may embody one or more processor(s).

First, the vehicle front camera receives a vehicle yaw rate signal, vehicle speed information, etc. of a vehicle, and provides lane information, a lane offset, and curvature information for the purpose of vehicle control. Herein, when the yaw rate signal used inside the front camera is incorrectly input or erroneously corrected, there is an error in an output value, which results in malfunction when controlling the vehicle using the front camera. Accordingly, the present embodiment is characterized in that a signal processing unit inside the front camera enables determining whether the front camera is abnormal, in which when the signal of the front camera is input or corrected, the reliability is determined by comparing a camera signal of the front camera with a vehicle signal. Specifically, according to this embodiment, when it is determined that the signal of the front camera is abnormal, the monitoring unit 50 outputs the front camera abnormal signal to at least one of a warning unit 60 that notifies the driver of the abnormality, or a vehicle control unit 70 that performs control in such a manner as to transition an operation of the vehicle control system using the front camera to a standby state, thereby preventing malfunction when controlling a vehicle using the front camera.

The vehicle information input unit 10 receives overall vehicle control information from a vehicle control system that controls an operation of a vehicle, and further receives a vehicle speed and a yaw rate signal of a vehicle according to the embodiment. In addition, the vehicle information input unit 10 may receive the vehicle speed and the yaw rate signal of the vehicle, as well as sensing signals from sensors that sense steering angle, wheel speed, etc.

The navigation information input unit 20 receives a road curvature signal provided in a high precision map, and may provide the monitoring unit 50 with a road curvature value of a driving trajectory of a vehicle.

The LiDAR & radar sensor input unit 30 may receive sensing values from a light detection and ranging (LiDAR) sensor and a radio detection and ranging (radar) sensor provided in the vehicle. Meanwhile, although it is described that the LiDAR and the radar are integrated with each other in the embodiment, it does not mean that they are necessarily provided as an integrated sensor. The LiDAR sensor and the radar sensor may be separately provided, and both sensors may be provided in the vehicle, or only one of the two sensors may be provided.

The camera information input unit 40 receives camera signal information including a vehicle speed and a yaw rate signal from the vehicle front camera, and provides the same to the monitoring unit 50. Herein, in this embodiment, it is possible to determine whether the front camera is abnormal on the basis of the camera information provided by the camera information input unit 40. Meanwhile, although it is described that the camera information input unit 40 receives the camera signal from the front camera of the vehicle in the present embodiment, the camera information input unit 40 may receive camera signals from another camera provided in the vehicle.

The monitoring unit 50 sets a reference value on the basis of signals input from the vehicle information input unit 10 and the navigation information input unit 20 and compares the reference value with a signal input from the camera information input unit 40 to determine whether the front camera is abnormal. Herein, although not specifically described in this embodiment, the reference value may be set including the curvature value input from the LiDAR & radar sensor input unit 30.

Specifically, the monitoring unit 50 includes a signal processing unit 52, a vehicle trajectory calculator 54, a reference curvature calculator 56, and a reliability determiner 58. The monitoring unit 50 calculates a vehicle travel trajectory using a vehicle speed and a yaw rate signal of a vehicle, which are input from the vehicle information input unit 10, calculates a reference curvature value on the basis of at least one of the calculated vehicle travel trajectory or the road curvature signal from the navigation information input unit 20, and determines the reliability by comparing the calculated reference curvature value with a curvature value calculated by the camera signal input from the camera information input unit 40.

Herein, the signal processing unit 52 filters signals input from at least one of the vehicle information input unit 10, the navigation information input unit 20, or the camera information input unit 40, and also filters signals input from the LiDAR & radar sensor input unit 30. In addition, the signal processing unit 52 may provide each of the filtered signals to at least one of the vehicle trajectory calculator 54 or the reference curvature calculator 56. The method of filtering the signals received from the signal processing unit 52 may be implemented in various ways.

In addition, the vehicle trajectory calculator 54 calculates the vehicle driving trajectory on the basis of the vehicle speed and the yaw rate signal from the vehicle information input unit 10, in which the yaw rate signal may be an offset-corrected signal. Herein, the vehicle trajectory calculator 54 may calculate a first curvature value by dividing a yaw rate value of the offset-corrected yaw rate signal by a vehicle speed value of the vehicle speed signal. That is, the first curvature value means a curvature value for a first signal output from the vehicle trajectory calculator 54.

In addition, the vehicle trajectory calculator 54 may calculate the vehicle driving trajectory when the vehicle speed value and the yaw rate value are equal or less than a threshold value. This is to exclude situations of excessive steering and sudden acceleration/deceleration. In other words, in the case of excessive steering or sudden acceleration or deceleration, the vehicle driving trajectory is not calculated.

Next, the reference curvature calculator 56 combines the first curvature value calculated by the vehicle trajectory calculator 54 with a second curvature value of a road curvature signal received from the navigation information input unit 20, thereby calculating the reference curvature value. That is, the second curvature value refers to a road curvature signal provided in the high precision map of the navigation information input unit 20, that is, a curvature value for the second signal.

In addition, when the second curvature value is input from the navigation information input unit 20, the reference curvature calculator 56 calculates the reference curvature value by combining the first curvature value and the second curvature value, and when the second curvature value is not input from the navigation information input unit 20, the reference curvature calculator 56 may determine the first curvature value as the reference curvature value. Herein, the curvature value input from the LiDAR & radar sensor input unit 30 is a third curvature value, in which the reference curvature value may be calculated by combining the first curvature value, the second curvature value, and the third curvature value, but is not limited thereto.

The reliability determiner 58 may calculate the reliability value of the front camera when the camera signal curvature value calculated using the camera signal is equal to or greater than a threshold value compared to the reference curvature value. That is, the reliability determiner 58 may calculate the reliability value of the front camera when the camera signal curvature value calculated by the camera signal is greater than the reference curvature value by a threshold value or more.

Herein, when the curvature value of the camera signal is equal to or greater than the threshold value compared to the reference curvature value, the reliability determiner 58 may determine a percentage value of to difference between the camera signal curvature value and the reference curvature value as the reliability value of the front camera.

In addition, the monitoring unit 50 may determine that the signal of the front camera is abnormal when the reliability value is greater than or equal to a threshold value during the predetermined time. Further, when it is determined that the signal of the front camera is abnormal, the monitoring unit 50 may output the front camera abnormal signal to the warning unit 60 and the vehicle control unit 70. That is, the monitoring unit 50 may inform the driver of the front camera abnormal state by outputting the front camera abnormal signal to the warning unit 60, and perform control in such a manner as to transition an operation of the vehicle control system using the front camera to a standby state by outputting the abnormal signal to the vehicle control unit 70, thereby preventing malfunction due to the abnormality in the front camera.

Figure 2:
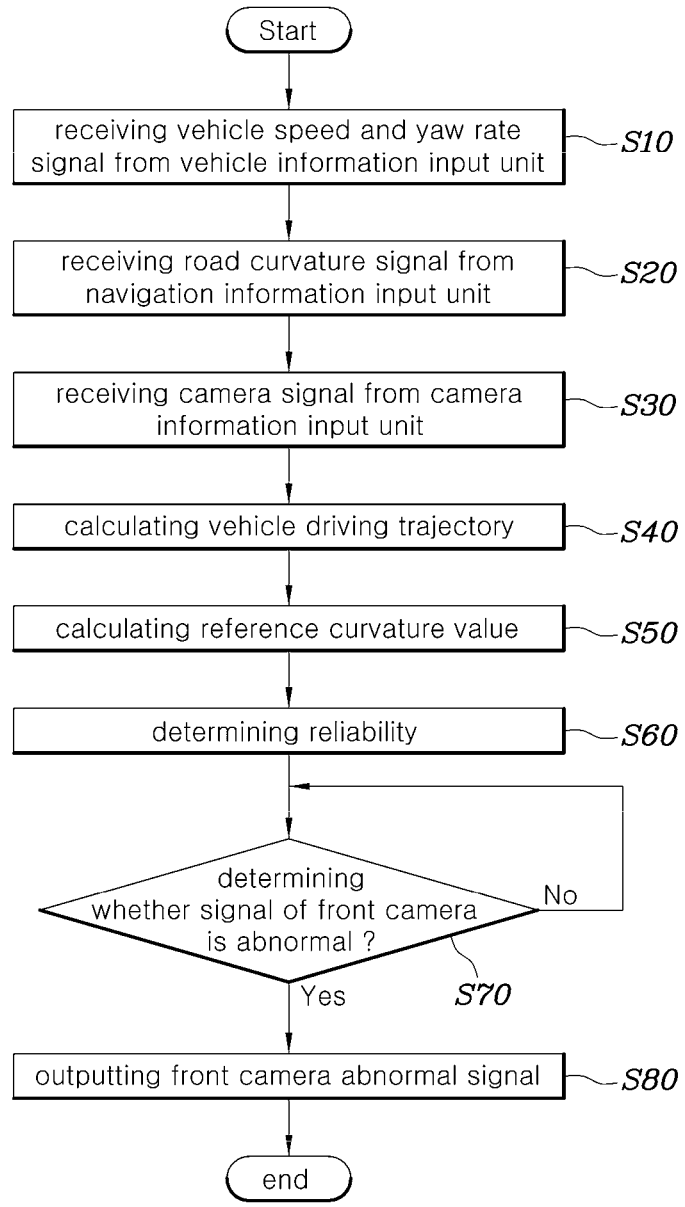
FIG. 2 is a flowchart showing a camera signal monitoring method according to an embodiment of the present disclosure.

FIG. 2 is a flowchart showing a camera signal monitoring method according to an embodiment of the present disclosure. Referring to FIG. 2, a camera signal monitoring method is described as follows.

As shown in FIG. 2, in the camera signal monitoring method according to an embodiment of the present disclosure, the monitoring unit 50 first receives a vehicle speed and a yaw rate signal of a vehicle from the vehicle information input unit 10 (S10).

Herein, the vehicle information input unit 10 receives overall vehicle control information from a vehicle control system that controls an operation of the vehicle, and according to this embodiment, receives the vehicle speed and the yaw rate signals of the vehicle.

Then, the monitoring unit 50 receives a road curvature signal provided in a high precision map from a navigation information input unit 20 (S20).

Herein, the navigation information input unit 20 receives a road curvature signal provided in the high precision map, and can provide the monitoring unit 50 with a road curvature value of a driving trajectory of the vehicle. In this embodiment, the road curvature signal input from the navigation information input unit 20 may be referred to as a second signal or a second curvature value.

Next, the monitoring unit 50 receives a camera signal including a vehicle speed and a yaw rate signal of the vehicle front camera from the camera information input unit 40 (S30).

Herein, the camera information input unit 40 receives camera signal information including a vehicle speed and a yaw rate signal from the vehicle front camera, and provides the same to the monitoring unit 50. According to this embodiment, it is possible to determine whether the front camera is abnormal on the basis of the camera information provided by the camera information input unit 40.

Meanwhile, in the present embodiment, the monitoring unit 50 may filter signals input from at least one of the vehicle information input unit 10, the navigation information input unit 20, or the camera information input unit 40.

Then, the monitoring unit 50 may calculate a vehicle driving trajectory using the vehicle speed and yaw rate signals of the vehicle, which are input from the vehicle information input unit 10 (S40).

Herein, the monitoring unit 50 calculates the vehicle driving trajectory on the basis of the vehicle speed and the yaw rate signal from the vehicle information input unit 10, in which the yaw rate signal may be an offset-corrected signal. Herein, the monitoring unit 50 may calculate a first curvature value (first signal) by dividing a yaw rate value of the offset-corrected yaw rate signal by a vehicle speed value of the vehicle speed signal.

In addition, the monitoring unit 50 may calculate the vehicle driving trajectory when the vehicle speed value and the yaw rate value are less than or equal to the threshold value. This is to exclude situations of excessive steering and sudden acceleration/deceleration. In other words, in the case of excessive steering or sudden acceleration or deceleration, the vehicle driving trajectory is not calculated.

In addition, the monitoring unit 50 may calculate the reference curvature value on the basis of at least one of the calculated vehicle driving trajectory or a road curvature signal from the navigation information input unit 20 (S50).

Herein, the monitoring unit 50 may calculate the reference curvature value by combining the calculated first curvature value and a second curvature value of the road curvature signal received from the navigation information input unit 20. Then, when the second curvature value is input from the navigation information input unit 20, the monitoring unit 50 calculates the reference curvature value by combining the first curvature value and the second curvature value, and when the second curvature value is not input from the navigation information input unit 20, the monitoring unit 50 determines the first curvature value as the reference curvature value.

Next, the monitoring unit 50 may determine the reliability by comparing the calculated reference curvature value with the curvature value calculated using the camera signal input from the camera information input unit (S60).

Herein, the monitoring unit 50 may calculate the reliability value of the front camera, when the camera signal curvature value calculated by the camera signal is greater than or equal to a threshold value compared to the reference curvature value. That is, the monitoring unit 50 may calculate the reliability value of the front camera when the camera signal curvature value calculated by the camera signal is greater than the reference curvature value by a threshold value or more. In addition, when the camera signal curvature value is greater than or equal to the threshold value compared to the reference curvature value, the monitoring unit 50 may determine a percentage value of a difference between the camera signal curvature value and the reference curvature value as the reliability value of the front camera.

Meanwhile, according to this embodiment, when the reliability value is greater than or equal to the threshold value during the predetermined time, the monitoring unit 50 may determine whether the signal of the front camera is abnormal (S70), and when it is determined that the signal of the front camera is abnormal, the monitoring unit 50 may output an front camera abnormal signal (S80).

Herein, the monitoring unit 50 may output the front camera abnormal signal to at least one of the warning unit 60 that notifies the driver of the abnormality or the vehicle control unit 70 that performs control in such a manner as to transition an operation of the vehicle control system using the front camera to a standby state.

However, when it is determined in step S70 that the signal of the front camera is not abnormal, the monitoring unit 50 may determine whether the reliability value is equal to or greater than the threshold value during the predetermined time or may otherwise terminate the operation.

As described above, the camera signal monitoring apparatus and method according to an embodiment of the present disclosure has an advantage that the reliability is determined with respect with whether the signal output from the vehicle front camera is abnormal, to notify the driver of the abnormality or perform control in such a manner as to transition the state of the control system to the standby state, thereby preventing malfunction when controlling the vehicle using the camera.

In addition, the camera signal monitoring apparatus and method according to an embodiment of the present disclosure has an advantage that it is possible to primarily determine whether there is a problem with the camera signal by determining whether an calculation algorithm inside the camera is abnormal, rather than verifying the camera output signal, and when the camera signal is corrected, it is possible to prevent the camera from malfunctioning by comparing the camera signal with the vehicle signal.

The present disclosure has been described with reference to the embodiment shown in the drawings, but this is only exemplary, and those skilled in the art to which the art pertains will appreciate that various modifications and other equivalent embodiments are possible.

Therefore, the true technical protection scope of the present disclosure should be defined by the claims below.

What is claimed is:

1. A camera signal monitoring apparatus, comprising a processor which includes:
 a vehicle information input unit configured to receive a vehicle speed and a yaw rate signal of a vehicle;
 a camera information input unit configured to receive a camera signal including a vehicle speed and a yaw rate signal from a front camera; and
 a monitoring unit configured to calculate a vehicle driving trajectory using a vehicle speed signal and the yaw rate signal of the vehicle input from the vehicle information input unit, calculate a reference curvature value based on the calculated vehicle driving trajectory, and determine a reliability by comparing the calculated reference curvature value with a curvature value calculated by the camera signal input from the camera information input unit,
 wherein the monitoring unit includes a reliability determiner configured to calculate a reliability value of the front camera when the curvature value calculated using the camera signal is equal to or greater than a threshold value compared to the reference curvature value, and
 wherein the reliability determiner determines a percentage value of a difference between the curvature value and the reference curvature value as the reliability value of the front camera when the curvature value is equal to or greater than the threshold value compared to the reference curvature value.

2. The apparatus of claim 1, wherein the monitoring unit includes a vehicle trajectory calculator configured to calculate the vehicle driving trajectory on the basis of an offset-corrected yaw rate signal and the vehicle speed input from the vehicle information input unit,
 wherein the vehicle trajectory calculator is further configured to calculate a first curvature value by dividing a yaw rate value of the offset-corrected yaw rate signal by a vehicle speed value of the vehicle speed signal.

3. The apparatus of claim 2, further comprising:
 a navigation information input unit configured to receive a road curvature signal provided from a high precision map,
 wherein the monitoring unit further includes a reference curvature calculator configured to calculate the reference curvature value by combining the first curvature value calculated by the vehicle trajectory calculator and a second curvature value of the road curvature signal input from the navigation information input unit.

4. The apparatus of claim 3, further comprising a LiDAR & radar sensor input unit configured to receive a sensing value from a LiDAR or a radar to calculate a third curvature value,
 wherein the reference curvature calculator is further configured to calculate the reference curvature value by combining the first curvature value calculated by the vehicle trajectory calculator, the second curvature value of the road curvature signal input from the navigation information input unit, and the third curvature value input from the LiDAR & radar sensor input unit.

5. The apparatus of claim 1,
 wherein the monitoring unit determines that the camera signal of the front camera is abnormal and outputs a front camera abnormal signal when the reliability value is greater than or equal to a threshold value during a predetermined time, and
 wherein the monitoring unit outputs the front camera abnormal signal to at least one of a warning unit that notifies a driver of the abnormality or a vehicle control unit that performs control in such a manner as to transition an operation of a vehicle control system using the front camera to a standby state.

6. A camera signal monitoring method, comprising:
 receiving, by a monitoring unit, a vehicle speed signal and a yaw rate signal of a vehicle from a vehicle information input unit;
 receiving, by the monitoring unit, a camera signal including a vehicle speed and a yaw rate signal of a front camera from a camera information input unit;
 calculating, by the monitoring unit, a vehicle driving trajectory using the vehicle speed signal and the yaw rate signal of the vehicle, which are received from the vehicle information input unit;
 calculating, by the monitoring unit, a reference curvature value on the basis of the calculated vehicle driving trajectory; and
 determining, by the monitoring unit, a reliability by comparing the calculated reference curvature value with a curvature value calculated using the camera signal input from the camera information input unit,
 wherein the determining of the reliability includes calculating a reliability value of the front camera, when the curvature value calculated by the camera signal is equal to or greater than a threshold value compared to the reference curvature value, and
 wherein the determining of the reliability further includes determining a percentage value of a difference between the curvature value and the reference curvature value as the reliability value of the front camera, when the curvature value is equal to or greater than the threshold value compared to the reference curvature value.

7. The method of claim 6, wherein the calculating of the vehicle driving trajectory includes calculating the vehicle driving trajectory based on an offset-corrected yaw rate signal and the vehicle speed signal from the vehicle information input unit, wherein a first curvature value is calculated by dividing a yaw rate value of the offset-corrected yaw rate signal by a vehicle speed value of the vehicle speed signal.

8. The method of claim 7, further comprising:
receiving, by the monitoring unit, a road curvature signal provided by a high precision map from a navigation information input unit,
wherein the calculating of the reference curvature value includes calculating the reference curvature value by combining the first curvature value obtained in the calculating of the vehicle driving trajectory and a second curvature value of the road curvature signal input from the navigation information input unit.

9. The method of claim 8, further comprising:
receiving, by a LiDAR & radar sensor input unit, a sensing value from a LiDAR or a radar to calculate a third curvature value,
wherein the calculating of the reference curvature value further includes calculating the reference curvature value by combining the first curvature value calculated in the calculating of the vehicle driving trajectory, the second curvature value of the road curvature signal input from the navigation information input unit, and the third curvature value input from the LiDAR & radar sensor input unit.

10. The method of claim 6, further comprising:
determining, by the monitoring unit, that the camera signal of the front camera is abnormal and outputting a front camera abnormal signal, when the reliability value is greater than or equal to a threshold value during a predetermined time,
wherein the outputting of the front camera abnormal signal includes outputting the front camera abnormal signal to at least one of a warning unit that notifies a driver of the abnormality or a vehicle control unit that performs control in such a manner as to transition an operation of a vehicle control system using the front camera to a standby state.

* * * * *